Sept. 21, 1965  B. E. O'CONNOR  3,207,047
SEALED ROTARY ACTUATOR
Filed March 28, 1962  2 Sheets-Sheet 1
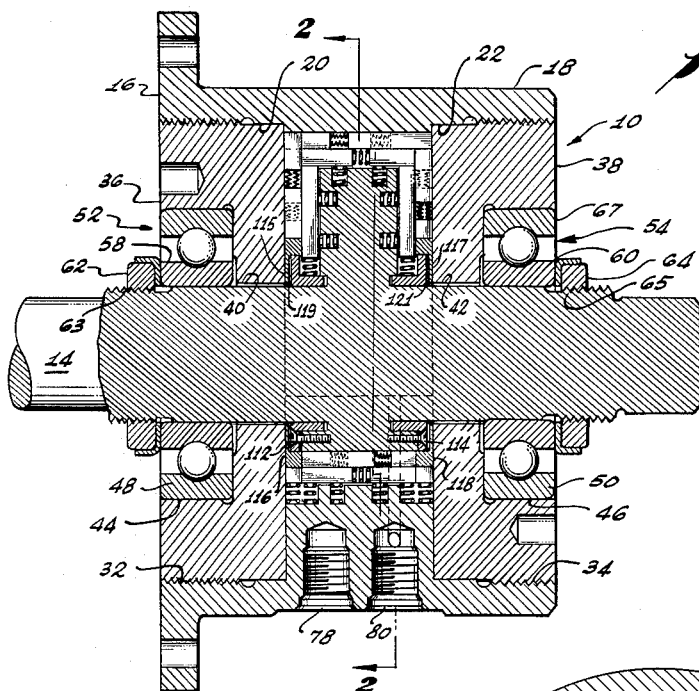
Fig. 1
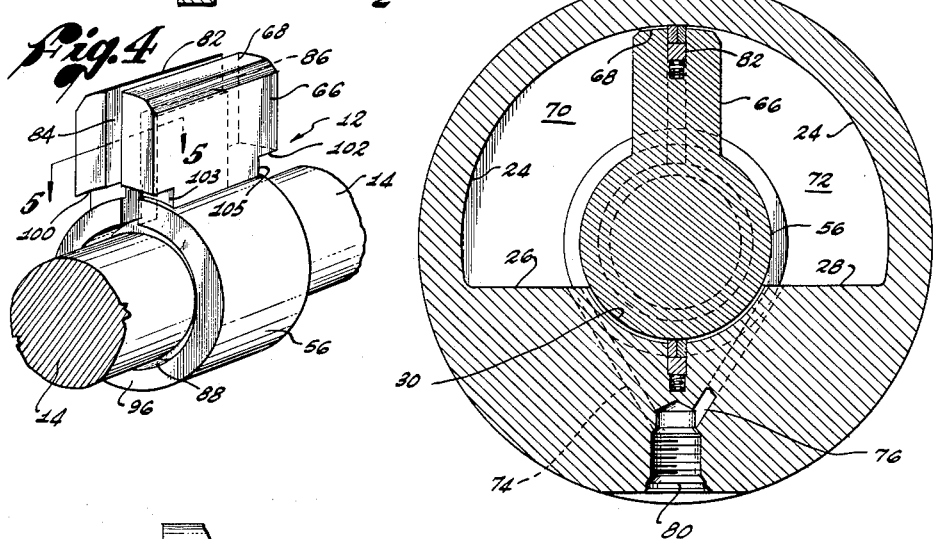
Fig. 2
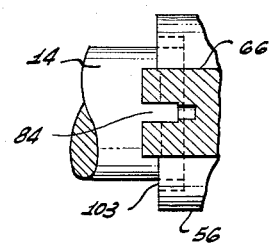
Fig. 5
Fig. 4
INVENTOR.
BERNARD E. O'CONNOR
BY
ATTORNEYS Sept. 21, 1965  B. E. O'CONNOR  3,207,047
SEALED ROTARY ACTUATOR
Filed March 28, 1962  2 Sheets-Sheet 2
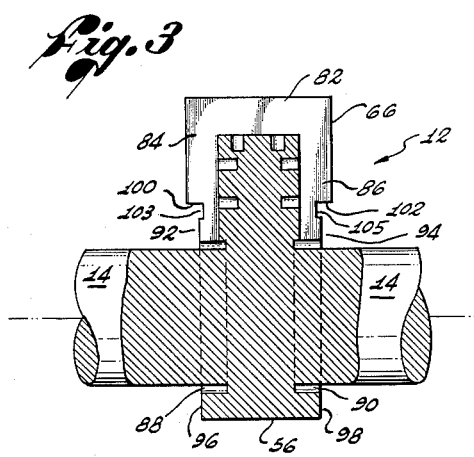
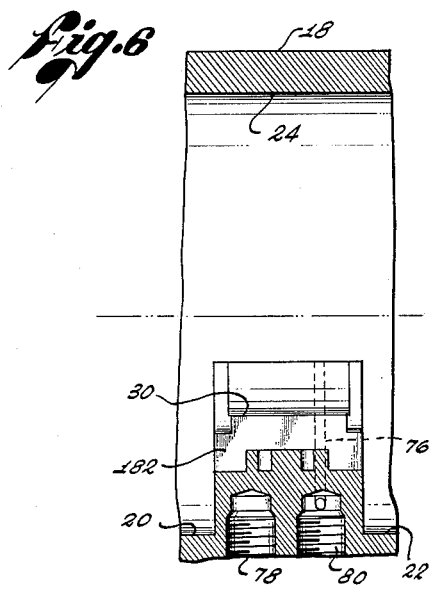
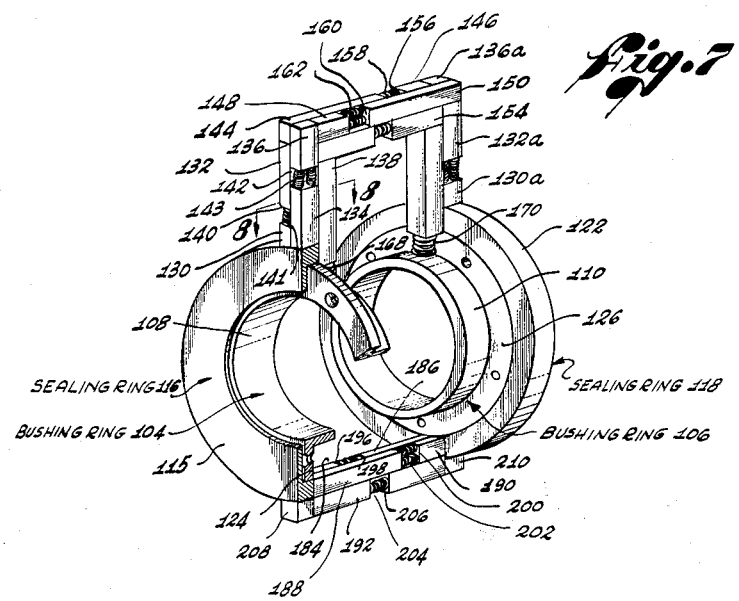
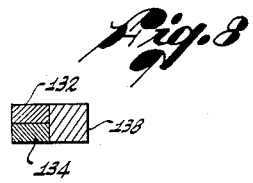
INVENTOR.
BERNARD E. O'CONNOR
BY Fulwider Mattingly & Huntley
ATTORNEYS United States Patent Office 3,207,047
Patented Sept. 21, 1965

3,207,047
SEALED ROTARY ACTUATOR
Bernard E. O'Connor, Playa Del Rey, Calif., assignor to Lionel-Pacific, Inc., Gardena, Calif., a corporation of Delaware
Filed Mar. 28, 1962, Ser. No. 183,091
16 Claims. (Cl. 92—124)

This invention relates to fluid actuator mechanisms, and more particularly to improvements in sealed rotary type actuators suitable for the operation of pivotally adjustable devices, such as various control means employed in aircraft, rockets, missile boosters, and the like.

The apparatus of this invention is particularly adapted to and finds its most important application in connection with attitude control, fuel feed and combustion regulation, and the like functions in connection with chemically propelled rocket devices, where the actuating fluid to be used comprises high pressure, highly fugitive fluids, such as hot combustion gases, or hydrogen and the like fuels.

As is well known, the emphasis upon light, compact devices for use in aircraft and rocket mechanisms has made rotary actuators more desirable than linear actuators. But despite such recognized advantages of rotary actuators over linear actuators, the added difficulty in suitably sealing rotary actuators against leakage of fluid from and between their working parts and chambers has heretofore militated against their general acceptance, and this difficulty has been particularly critical in connection with the use therein of the before mentioned highly fugitive gases. Such difficulty is further multiplied where the temperatures of the fluid or gases employed in the actuator may be extremely low, as with liquified, normally gaseous fluids, or extremely high, as with combustion gases, or where such temperatures may vary over a wide range.

Heretofore, in the more or less conventional types of rotary actuators, the working chambers have generally been formed by providing an actuator shaft with one or more elongated, radial vanes that extend into arcuate spaces formed between circumferentially spaced apart, inwardly projecting barriers of a surrounding housing. The outer edge and end surfaces of such vanes are positioned in sliding engagement with inner side wall surfaces of the housing, and an inner partitioning member of the housing is usually positioned in sliding sealing engagement with the longitudinal surface of the shaft opposite the radial vane. Thus, there is formed a closed, elongated, arcuate, or cylindrical segmental working chamber of variable volume on opposite sides of the radial vane and through which the radial vane may be angularly moved.

The direction and force of angular movement of the vane and resultant corresponding movement of the shaft relative to its housing is determined by the difference in fluid pressure in the working chambers on opposite sides of such vane. The smaller the vanes are, the more important it is that there be a minimum of leakage of fluid either from the high-pressure chamber to the low-pressure chamber or from the chambers to the exterior of the housing. One way of minimizing leakage has been to make all abutting, relatively moving sealing surfaces carefully machined and highly polished and to force such surfaces together under relatively high sealing forces. However, such arrangements still result in undesirably high quantities of fluid leakage between chambers and, moreover, result in excessive friction. Furthermore, such construction is highly susceptible to difficulties resulting from temperature changes.

It is an object of this invention, therefore, to provide an improved rotary actuator that avoids the before mentioned difficulties associated with rotary actuators, as heretofore constructed.

It is another object of this invention to provide a rotary actuator that effectively minimizes leakage of the pressure fluids between the working chambers that contain fluids at different pressures.

A further object of this invention is to provide a rotary actuator that incorporates sealing elements uniquely arranged substantially to prevent escape of fluid from either of the working chambers to the exterior of the housing, and leakage of fluid from high-pressure chamber to low-pressure chamber around or between any part of the shaft, hub, or vane and the housing.

It is a still further object of this invention to provide a fluid sealing arrangement for rotary actuators, which is particularly capable for maintaining very low leakage, as aforesaid, over a wide range of actuating fluid temperatures.

It is still another object and an important feature of this invention to provide a fluid sealing arrangement for rotary actuators which has greatly improved tolerance for distortions in shape and dimensions in the housing and various other parts thereof, whether resulting from mechanical forces or pressure applied thereto or from non-uniformity of temperatures or temperature changes therein.

It is another object of this invention to provide an improved rotary actuator mechanism that is characterized by the before mentioned features, including freedom from leakage and at the same time exhibits relatively low-friction operational characteristics under all conditions.

These and other objects, advantages, and features of novelty of this invention will become apparent from the following description taken in conjunction with the accompanying drawings which illustrate a presently preferred embodiment thereof, and in which:

FIGURE 1 is a longitudinal sectional view of the rotary actuator assembly, showing the arrangement of the sealing rings and sealing elements for eliminating leakage paths between and around the differential pressure portions of the actuator.

FIGURE 2 is a cross-sectional view taken along line 2—2 of FIGURE 1, showing the relative positions of the parts of the rotary actuator intermediate the ends of the shaft.

FIGURE 3 is a fragmentary, longitudinal sectional view of the shaft, hub, and vane portions taken on the same plane as that of FIGURE 1, but with the sealing rings, sealing elements, and housing omitted.

FIGURE 4 is a perspective view of the shaft, hub, and vane portions of the actuator of FIGURES 1, 2, and 3, with the sealing rings and elements omitted, showing the arrangement of grooves and slots for receiving the sealing rings and elements.

FIGURE 5 is a fragmentary, sectional view taken on line 5—5 of FIGURE 4.

FIGURE 6 is a fragmentary, longitudinal, sectional view of the central portion of the actuator housing taken on the same plane as that of FIGURE 1, but with the rotor shaft, hub, vane, sealing rings, and end closure plates omitted.

FIGURE 7 is an enlarged, fragmentary, perspective, detailed view showing the construction and arrangement of the sealing rings and elements of the actuator.

FIGURE 8 is a cross-sectional view taken on line 8—8 of FIGURE 7.

Referring first mainly to FIGURES 1 and 2, the housing of the actuator assembly is shown generally at 10, in which a rotor 12, including a shaft 14 is rotatably mounted. The housing 10 and the shaft 14 are adapted for coupling to respective apparatus elements (not shown) that are to be rotated or moved relative to one another.

Such coupling may be made by suitably keying the shaft 14 to one apparatus element and by securing the housing 10 by suitable means, such as a bolt flange 16, to the other apparatus element.

The housing 10 comprises a hollow casing 18 formed with a generally cylindrical exterior and an interior space extending therethrough from end to end formed by a pair of circular end openings 20 and 22 extending inwardly from the opposite ends of the housing, and a central cavity, intermediate such openings bounded on one side by an axially extending, semi-cylindrical, inner wall surface portion 24, and on the other side by a pair of crosswise extending, inner wall surface portions 26 and 28, joined at their inner portions by an intermediate, semi-cylindrical wall surface in the form of a concavity 30 which is coaxial with the semi-cylindrical, inner wall portion 24. Threaded at 32 and 34 into the end bores 20 and 22 of the housing 18 are a pair of oppositely facing, annular, end closure plates 36 and 38, which cover the otherwise open ends of the central cavity in the housing, to form a closed working chamber for the actuator piston or vane 66, as hereinafter more fully described.

The end closure plates 36 and 38 are formed with coaxial shaft entrance bores, the innermost minimum diameter portions 40 and 42 of which are, except for slight clearance, substantially equal to the outside diameter of the oppositely extending end portions of the shaft 14. Each of such bores 40 and 42 of the end closure plates 36 and 38 are formed at their outer ends with outwardly facing, coaxial, annular recesses, as shown at 44 and 46, to accommodate outer race rings 48 and 50 of a pair of ball bearing assemblies 52 and 54, respectively.

The before mentioned shaft 14 is formed with an integral, coaxial, intermediately located, cylindrical hub portion 56 of increased diameter relative to the balance of the shaft 14, the radius of the effective exterior surface of such hub portion 56 being substantially equal, with slight clearance, to the radius of the surface of the before mentioned semi-cylindrical cavity 30 extending axially between the opposite inner surfaces of the end closure plates 36 and 38. The portions of the shaft 14 adjacent to and extending coaxially outwardly in opposite directions from the hub portion 56 are supported coaxially within the central bores of the end closure plates 36 and 38 within inner race rings 58 and 60 of the before mentioned ball bearing assemblies 52 and 54. The ball bearing assemblies 52 and 54 are retained in their recesses 44 and 46 by means of a pair of thrust nuts 62 and 64 which are adjustable on threads 63 and 65 on the shaft 14 to apply slight, axially inwardly directed preloading through the inner race rings 58 and 60 to the ball bearing assemblies. By means of such adjustment of the thrust nuts 62 and 64, sufficient axial and radial preloading is applied to the ball bearing assemblies 52 and 54 to remove substantially all axial and radial play therein. Maintenance of precise centering and positioning of the shaft 14 and the rotor assembly 12 within the housing is thus insured.

Extending laterally and preferably radially from the hub portion 56 is a piston element or vane 66. The outer edge 68 of the vane 66 is formed with a cylindrically curved surface which is coaxial with and has substantially the same radius of curvature, except for slight clearance, as the semi-cylindrical inside wall surface 24 of the casing 18. The diametrically opposite, cylindrical surface of the hub 56, as best shown in FIGURE 2, has an outside diameter which is substantially the same, with provisions for slight clearance, as that of the before mentioned semi-cylindrical concavity 30 within the casing 18 within which the hub rotatably fits. With the shaft 14, hub 56, and vane 66 thus assembled within the interior of the housing and casing, it will be seen that a closed chamber is thereby formed in the housing having the shape substantially of a sector of a hollow cylinder, and that such chamber is divided into two chamber parts 70 and 72 of variable volumes on opposite sides of the vane 66, and that the vane may be rotated therein between the inner wall portions 26 and 28 upon or with shaft 14 through an angle of substantially 180°, with resultant reduction in the volume of one of the chambers and proportional increase in the volume of the opposite chamber, and vice versa.

Ducts 74 and 76 are provided through the housing 18, leading from each of the before mentioned chambers 70 and 72 on opposite sides of the vane 66 to exterior threaded ports 78 and 80 to which threaded connection may be made selectively to suitable actuating pressure fluid sources and exhaust systems (not shown).

As will be apparent, the force applied to the shaft 14 tending to rotate it in one direction or the other is dependent upon the difference between the fluid pressures in the chambers 70 and 72 on opposite sides of the vane 66. Thus, in operation, if port 80 leading to chamber 72 is connected to a fluid pressure source, and port 78 leading from chamber 70 is connected to an exhaust system of low pressure, force will be applied to the vane 66 tending to rotate it and the shaft 14 in a counterclockwise direction, as viewed in FIGURE 2, and vice versa when the port 78 is connected to the fluid pressure source and the port 80 connected to the exhaust system.

In the absence of suitable sealing means between the rotor assembly 12 and the inside surfaces of the housing, there are a number of possible paths of fluid leakage between the chambers 70 and 72 and from the chambers 70 and 72 to the exterior of the housing. Possible paths for leakage between the chambers 70 and 72 are around the outer edge and end surfaces of the vane 66, circumferentially around the shaft 14 adjacent the ends of the hub 56 and through the clearance space between the back side of the hub 56 and the surface of the semi-cylindrical concavity 30 of the housing, and the possible paths of leakage from the chambers to the exterior of the housing are radially past the ends of the hub portion 56 and thence axially along the shaft 14 through the bores 40 and 42 in the end closure plates 36 and 38. To prevent such leakages, a unique and improved sealing means, which is an important feature of this invention, is provided for the shaft, hub, and vane, as will hereinafter be described.

The outer cylindrical edge 68 of the vane 66 is provided with a longitudinally extending, rectangular slot 82, and the opposite, radially extending end faces of the vane 66 are provided with radially extending, rectangular slots 84 and 86 joining at their outer ends with the aforesaid longitudinal slot 82, such slots 82, 84, and 86 together, in effect, forming a generally U-shaped slot arrangement extending around vane 66. Also, the end surfaces of the vane 66 and hub portion 56 have axially oppositely facing undercut annular grooves 88 and 90, the inner or minimum diameter sides of which are preferably, although not necessarily, continuations of and of the same diameter as that of the adjacent portion of the shaft 14. The opposite, radially extending end faces of the vane 66 are also undercut, in effect, by an annular groove, as indicated at 92 and 94 in FIGURE 3, such undercut having the effect of determining the axial length of the hub 56 at the annular shoulders 96 and 98, and also forming on either end of the vane a pair of arcuate, radially inwardly facing shoulders 100 and 102, and also forming a pair of axially shallow, arcuate, undercut grooves 103 and 105 extending around the end shoulders 96 and 98 under the before mentioned shoulders 100 and 102, such grooves 103 and 105 being adapted to receive the axially extending edge portions of sealing rings 116 and 118, as hereinafter described.

Vane 66 and hub portion 56 are provided with a pair of annular, L-sectioned bushing rings 104 and 106 which encircle the shaft 14, and which are positioned thereon with the inner, axially extending, annular cylindrical leg portions 108 and 110 thereof contained within the before mentioned undercut, annular grooves 88 and 90 and with the confronting radially outwardly extending annular surfaces of the radially outwardly extending, annular flange leg portions 124 and 136 thereof in abutment with the annular faces 96 and 98 of the opposite ends of the hub 56 and the co-extensive undercut portion of the vane 66. The bushing rings 104 and 106 are held firmly in place by means of a plurality of countersunk head screws, as shown at 112 and 114 in FIGURE 1. A pair of L-sectioned annular sealing rings encircle shaft 14, as shown at 116 and 118, the radially inwardly extending annular flange leg portions 115 and 117 of which are relatively thin and extend coextensively parallel with and closely adjacent to, but preferably slightly spaced from the axially facing annular surfaces of the annular leg flanges 124 and 126 of bushing rings 104 and 106. The inner edges of the flange leg portions 115 and 117 are also separated by a small clearance from the surface of shaft 14. Small spaces are thus provided between the adjacent confronting faces of the annular flange leg portions 115 and 117 of the sealing rings and the annular flange leg portions 124 and 126 of the bushing rings, and such spaces are in communication with the exterior of the housing by way of the clearance spaces between the shaft and the bores 40 and 42 of the end closure plates 36 and 38, and through the bearings 52 and 54. The outer, axially extending annular cylindrical leg portions 120 and 122 of seal rings 116 and 118 encircle the outer edge peripheries of the annular flange legs 124 and 126 of the bushing rings 104 and 106. With the bushing rings 104 and 106 installed on the ends of the hub 56 and with the seal rings 116 and 118 in place in endwise abutment and encircling relationship with the bushing rings 104 and 106, as before described, the axially, outwardly facing, annular surfaces of the seal rings 116 and 118 occupy positions substantially flush with the radially extending, oppositely, axially facing end surfaces of the vane 66, and in operation make rotational sliding engagement with the inner adjacent surfaces of the end closure plates 36 and 38 immediately surrounding shaft 14. A fluid seal is thus formed by the bushing rings 104 and 106, and the seal rings 116 and 118, which resists leakage of fluid from the working chambers of the actuator radially past the ends of the hub portion 56 and outwardly through the clearance spaces between the shaft 14 and the bores 40 and 42 of the end closure plates 36 and 38.

The rectangular, radially extending slots 84 and 86 formed in the opposite end faces of the vane 66, and the rectangular, longitudinally extending slot 86 in the outer edge of the vane 66, which together form the before mentioned U-shaped slot arrangement, contain a plurality of overlapping and interengaging, elongated, rectangular sealing elements which will be immediately hereinafter more fully described.

Each of the radially extending, rectangular slots 84 and 86 in the opposite ends of the vane 66 contain an identical set or bundle of rectangular sealing elements, except that one set is arranged in left hand order with respect to the other set, as viewed from one end of shaft 14. Therefore, a description of one of the sets will substantially suffice for both.

Accordingly, the radial slot 84 contains five elongated, rectangular sealing elements 130, 132, 134, 136, and 138 all grouped together in parallel, side by side, overlapping abutment to form a generally rectangular assembly which makes snug, but freely slidable engagement both lengthwise (radially) and crosswise (axially of the vane) within the slot 84. One outer pair of these sealing elements, 130 and 132, are positioned in lengthwise alignment with respect to one another and separated endwise by an intermediate gap 140 in which is positioned a pair of small helical springs 141 normally acting under axial compression to bias the elements 130 and 132 lengthwise apart.

Another parallel pair of these sealing elements 134 and 136 are similarly arranged in longitudinal alignment and separated endwise by an intermediate gap 142 containing a pair of biasing springs 143. Another one of the sealing elements 138, extends parallel and in covering abutment with the full width of the inwardly facing surfaces of the before mentioned two parallel pairs of sealing elements 130, 132 and 134, 136. The width of the sealing element 138, circumferentially of the rotor assembly, is thus equal to the sum of such widths of both of the two parallel outside pairs of sealing elements 130, 132 and 134, 136.

The radially inner ends of sealing elements 130 and 134 rest peripherally slidably upon the outer cylindrical surface of the outer axially extending cylindrical leg portion 120 of the L-sectioned sealing ring 116. The outer end of sealing element 132, under the outward bias of springs 141, makes flush engagement with the undersurface of the end portion of one of the longitudinal sealing elements 144 contained in the longitudinally extending slot 82 in the outer edge of the vane 66, as will be further described. Also, the outer end of sealing element 136, under the outward bias of springs 143, makes abutting and, in operation, sliding engagement with the inner cylindrical wall 24 of the housing, and such abutting end of the element 136 is shaped to conform to such cylindrical surface of the wall 24.

The longitudinally extending slot 82 in the outer edge of vane 66 contains a set or bundle of six elongated, longitudinally extending, rectangular sectioned sealing elements which are similar in form and arrangement to that hereinbefore described for the radially extending slots 84 and 86, such longitudinally extending sealing elements being best shown in FIGURE 4 at 144, 146, 148, 150, 152, and 154. An outer pair of the longitudinally extending sealing elements 144 and 146 are positioned in lengthwise alignment with respect to one another and separated endwise by an intermediate gap 156 in which is positioned a pair of helical springs 158, such springs normally acting under axial compression to bias the sealing elements 144 and 146 longitudinally apart. Another outer pair of these longitudinal sealing elements 148 and 150 are similarly arranged in lengthwise alignment with respect to one another and separated endwise by an intermediate gap 160 containing a pair of biasing springs 162, such springs 162 normally acting under axial compression to bias the elements 148 and 150 longitudinally apart. An inner pair of these sealing elements 152 and 154 extend in lengthwise alignment along and in covering abutment with the full width of the inwardly facing surfaces of the before mentioned parallel outer pairs of sealing elements 144, 146, and 148, 150. The sealing elements 152 and 154 are separated by a gap 164 in which is positioned a pair of helical springs 166, which act under axial compression to bias the elements 152 and 154 longitudinally apart.

Under the biasing force of the springs 158, the sealing elements 144 and 146 are, as hereinbefore mentioned, forced longitudinally apart, and this results (when the rotor is assembled in the housing) in the outer end of sealing element 144 being urged into abutment with the inner surface of one of the end closure plates 36 and the opposite outer end of the sealing element 146 being urged into abutment with the inner surface of the outer end portion of the radially extending sealing element 136a which is the counterpart, in reverse arrangement, of the before described sealing element 136.

The biasing springs 162 acting under compression, as hereinbefore described, urge the sealing elements 148 and 150 longitudinally apart, resulting in the outer end of the sealing element 148 being forced into abutment with the inner surface of the outer end portion of the radial sealing element 136, and results in the opposite outer end of the sealing element 150 being urged into engagement with the inner surface of the end closure plate 38. The pair of bias springs 166 acting between the inner longitudinal pair of sealing elements 152 and 154 urges them longitudinally apart, as hereinbefore described, resulting in the outer ends of the sealing elements 152 and 154 being urged into abutment with the inner surfaces of the outer end portions of the pair of radial sealing elements 132, 136 and 132a and 136a. A pair of relatively larger helical springs 168 and 170 act in compression between the axially extending legs 108 and 110 of the L-sectioned bushing rings 104 and 106 and the inner ends of the radial sealing elements 138 and 138a urging them radially outwardly in the vane slots 84 and 86 such that their outer ends are maintained in abutment with the undersurfaces of the outer, longitudinal sealing elements 152 and 154, respectively.

As best shown in FIGURE 1, the rotor vane 66 is provided with a plurality of cylindrical recesses containing helical biasing springs, as shown at 170, 172, 174, 176, 178, and 180. The helical biasing springs 170 and 172 are positioned in the bottom of the radial slot 84 and act under compression to force the radial sealing element 138 sidewise in the slot 84 against the pairs of sealing elements 130, 132 and 134, 136, which are in turn thereby forced sidewise into firm sliding sealing engagement with the radially extending, inner surface of the end closure plate 36. Likewise, the helical bias springs 178 and 180 are positioned in the bottom of radial slot 86 and act under compression to force the radial sealing element 138a sidewise in the slot 86 into abutment with the adjacent outer pairs of sealing elements which are in turn forced sidewise into firm sliding sealing engagement with the radially extending, inner surface of the end closure plate 38. Similarly, helical biasing springs 174 and 176 acting under compression apply force to the under surfaces of the inner longitudinal sealing elements 152 and 154, thereby assisting springs 168 and 170 in maintaining the pairs of longitudinal sealing elements 144, 146 and 148, 150 in firm sliding sealing engagement with the inner cylindrical wall surface 24 of the housing. The outer edge surfaces of longitudinal sealing elements 144, 146, 148, and 150 and the end surfaces of the radial sealing elements 136 and 136a which make sliding engagement with the inner cylindrical wall surface 24 are shaped to conform to such cylindrical surface.

Sealing against leakage between the working chambers, formed on opposite sides of the vane 66, through the clearance between the back side of the hub portion 56 and the adjacent cylindrical concavity 30 of the housing, is effected by means of a sealing arrangement which is similar to that hereinbefore described in connection with vane 66.

Referring mainly to FIGURES 1, 2, 6, and 7, the housing is formed with a rectangular hub seal groove 182 extending radially in depth and longitudinally in length from end to end of the bottom of the semi-cylindrical concavity 30 into which the back side of the hub portion 56 opposite the vane 66 rotatably extends, such groove being closed at its opposite ends by the inner faces of the end closure plates 36 and 38. Contained within the before mentioned longitudinal hub seal groove 182 are a plurality of elongated, rectangular sectioned sealing elements 184, 186, 188, 190, 192, and 194 grouped together in side by side overlapping abutment to form a rectangular assembly which makes snug, but freely slidable engagement both lengthwise and radially within the slot 182. An inner pair of these sealing elements 184 and 186 are positioned in lengthwise alignment with respect to one another and are separated endwise by an intermediate gap 196, in which is positioned a pair of helical springs 198 normally acting under axial compression to bias the elements 184 and 186 axially apart and thereby urge the opposite outer ends thereof into firm sealing abutment with the axially inwardly facing radially extending, annular surfaces of the axially extending legs 120 and 122 of the seal rings 116 and 118, respectively. The other inner, parallel pair of sealing elements 188 and 190 are similarly arranged in axial alignment and separated endwise by an intermediate gap 200 containing the biasing spring 202, which biasing spring normally acts under axial compression to force the sealing elements 188 and 190 axially apart and thus likewise urge the opposite outer ends thereof into firm sealing engagement with the axially inwardly facing, radially extending, annular surfaces of the axially extending legs 120 and 122 of the seal rings 116 and 118, respectively.

Sealing elemnts 192 and 194, located in the bottom of groove 182, are arranged in axial alignment with one another and in sidewise contact with the adjacent surfaces of the before described pairs of sealing elements 184, 186 and 188, 190. The sealing elements 192 and 194 are separated endwise by a gap 204 containing a pair of helical springs 206 which, similar to those hereinbefore described, act under compression to force the sealing elements 192 and 194 longitudinally apart, and thereby place the outer opposite ends thereof into sealing engagement with rectangular sealing elements 208 and 210 which are contained within opposite end portions of the slot 182 and which ride upon the outer periphery of the axially extending legs 120 and 122 of the annular seal rings 116 and 118, respectively. The outer surfaces of the rectangular sealing elements 108 and 110 are thereby also urged axially outward into sealing engagement with the adjacent inwardly facing walls of the end cover plates 136 and 138.

A plurality of longitudinally, spaced apart sockets extend downwardly from the bottom of groove 182 into the housing and contain in each a helical spring, as shown at 212, 214, 216, 218, 220, and 222. The helical springs 212–222 inclusive serve to apply radially inward biasing forces to the sealing elements 208, 292, 294, and 210 which forces are, in turn, in part transmitted to the pairs of sealing elements 184, 186 and 188, 190 and thence to the adjacent cylindrical surface of the hub portion 56 of the rotor assembly.

In operation, the fluid pressure in chambers 70 and 72 on opposite sides of the vane 66 introduced through ducts 74 and 76 are controlled to provide a pressure differential as required to effect the desired direction of angular displacement of the vane 66 and shaft 14. For example, by establishing a higher pressure in chamber 70 than in chamber 72, the vane 66 and shaft 14 are caused to rotate angularly in a clockwise direction, as viewed in FIGURE 2. Similarly, by establishing a higher pressure in chamber 72 than in chamber 70, vane 66 and shaft 14 are caused to rotate angularly in a counterclockwise direction. Under either such conditions, leakage of fluid from one chamber to the other chamber passed the edges and ends of the vane 66, and also the escape of fluid therefrom along the shaft 14 is blocked by the hereinbefore described sealing elements, which by reason of their staggered and overlapping mutually contacting arrangement, close off all leakage channels therethrough and therearound. Leakage circumferentially around the shaft at the ends of the hub portion is effectively blocked by the sealing action of the arrangement of the bushing rings 104 and 106 and and the sealing rings 116 and 118. Leakage through the clearance space between the back side of the hub portion 56 and the adjacent cylindrical portion 30 of the housing is likewise blocked by the action of the sealing elements contained in the groove 182.

In event of pressure fluctuations or changes as a result of which the fluid pressure exterior of the actuator housing may be greater than those on the interior, provision is made by way of the clearance spaces between the end portions of shaft 14 and the entrance bores 40 and 42, as hereinbefore mentioned, for such exterior pressure to be communicated to the spaces 119 and 121 between the adjacent flange leg portions of the sealing rings and the bushing rings, whereby outward force is maintained against the sealing rings which prevents their being forced axially inwardly out of sealing contact with the adjacent surfaces of the end walls surrounding the shaft. Continuous sealing contact of the rings with the end wall surfaces and also proper sealing position of the sealing elements in the side grooves of the vane are thus insured under all conditions.

The housing, rotor assembly including the hub portion and vane 66 may be made of any of a number of alloy steels, one such, for example, being stainless steel. The bushings, sealing rings, and sealing elements may also be made of alloy steel, such as stainless steel.

The foregoing is illustrative only, and the invention is not to be limited thereby, but includes all modifications thereof within the scope of definition of the appended claims.

What is claimed is:

1. In a rotary actuator having a hollow housing for containing therein an actuator vane, and fluid under pressure, said housing being closed at the ends by a pair of end walls having inwardly confronting end wall surfaces, the combination comprising:

coaxially aligned shaft bores extending into said housing through said end walls;

a cylindrical shaft extending through said bores;

a coaxial, substantially cylindrical hub portion on said shaft in said housing intermediate said end wall surfaces, said hub portion having a greater diameter than said shaft and thereby forming axially, oppositely facing, annular shoulders at the opposite ends thereof;

an axially facing, coaxial, annular groove formed in each of said annular shoulders;

a pair of axially, oppositely facing, bushing rings coaxially surrounding said shaft, each of said bushing rings being L-shaped in radial section and thereby each having an inner, axially extending, annular cylindrical leg portion and an integral, radially outwardly extending, annular flange leg portion, each of said bushing rings being positioned with its said cylindrical leg portion contained within its respective one of said annular grooves and with the adjacent, radially extending face of its flange leg portion in abutment with its respective one of said annular shoulders;

and a pair of axially, oppositely facing sealing rings coaxially surrounding said shaft, each of said sealing rings being substantially L-shaped in radial section and thereby each having an outer, axially extending, annular cylindrical leg portion and an integral, radially inwardly extending, annular flange leg portion, each of said sealing rings being positioned with the radially inner cylindrical surface of its said cylindrical leg portion in coaxial, telescopic sealing engagement over the outer edge of said flange leg portions of one of each said bushing rings, and with the adjacent, radially extending surface of its said flange leg portion substantially coextensively adjacent the outer, radially extending, annular face of the flange leg portion of one of each of said bushing rings and with the opposite, outer, radially extending surface of said flange leg portion in abutment with one of each of said end wall surfaces.

2. In a rotary actuator, apparatus according to claim 1, and in which said adjacent, radially extending surface of said flange leg portions of said sealing rings are spaced axially outwardly from the outer, radially extending, annular face of the flange leg portions of said bushing rings, thereby providing a space therebetween.

3. In a rotary actuator, apparatus according to claim 2 and means providing communication between the exterior of said housing and said space.

4. In a rotary actuator having a hollow housing for containing therein an actuator vane and fluid under pressure, said housing being closed at the ends by a pair of end walls having inwardly confronting end wall surfaces, the combination comprising:

a shaft bore extending into said housing through at least one of said end walls;

a cylindrical shaft extending through said bore and into said housing;

a coaxial, substantially cylindrical hub portion on said shaft in said housing intermediate said end wall surfaces, said hub portion having a greater diameter than said shaft and thereby forming an axially facing, annular shoulder at an end thereof;

an axially facing, coaxial, annular groove formed in said annular shoulder;

a bushing ring coaxially surrounding said shaft, said bushing ring being L-shaped in radial section and thereby having an inner, axially extending, annular cylindrical leg portion and an integral, radially outwardly extending, annular flange leg portion, said bushing ring being positioned with its said cylindrical leg portion contained within said annular groove and with the adjacent, radially extending face of its flange leg portion in sealing abutment with said annular shoulder;

a sealing ring coaxially surrounding said shaft axially outwardly adjacent said bushing ring, said sealing ring being substantially L-shaped in radial section and thereby having an outer, axially extending, annular cylindrical leg portion and an integral, radially inwardly extending, annular flange leg portion, said sealing ring being positioned with the inner cylindrical surface of its said cylindrical leg portion in coaxial, telescopic sealing engagement over the outer edge of said flange leg portion of said bushing ring, with the adjacent, radially extending surface of its said flange leg portion substantially coextensively adjacent the outer, radially extending, annular face of said annular flange leg portion of said bushing ring and with the opposite outer, radially extending surface of said flange leg portion in abutment with the inner surface of one of said end walls.

5. In a rotary actuator, apparatus according to claim 4 and in which said adjacent, radially extending surface of said flange leg portion of said sealing ring is spaced axially from the said outer, radially extending annular face of the said annular flange leg portion of said bushing ring, thereby providing a space therebetween.

6. In a rotary actuator, apparatus according to claim 5 and means providing communication between the exterior of said housing and said space.

7. In a rotary actuator having a hollow housing for containing therein an actuator vane, and fluid under pressure, said housing being closed at the ends by a pair of end walls having inwardly confronting end wall surfaces, the combination comprising:

coaxially aligned shaft bores extending into said housing through said end walls;

a cylindrical shaft extending through said bores;

a coaxial, substantially cylindrical hub portion on said shaft in said housing intermediate said end wall surfaces, said hub portion having a greater diameter than said shaft and thereby forming axially, oppositely facing, annular shoulders at the opposite end thereof;

and a pair of axially, oppositely facing, sealing rings coaxially surrounding said shaft, each of said sealing rings being substantially L-shaped in radial section and thereby each having an outer, axially extending, annular cylindrical leg portion and an integral, radially inwardly extending, annular flange leg portion, one of each of said sealing rings being positioned with the radially inner cylindrical surface of its said cylindrical leg portion in coaxial telescopic sealing engagement over the outer edge of one of each end of said hub portion surrounding said annular shoulders, with the adjacent, radially extending surface of its said flange leg portion substantially coextensively adjacent the outer face of one of each of said annular shoulders, and with the opposite, outer, radially extending surface of its said flange leg portion in abutment with one of each of said end wall surfaces.

8. In a rotary actuator, apparatus according to claim 7, and in which said adjacent, radially extending surface of said flange leg portion of said sealing rings are spaced axially outwardly from the outer faces of said annular shoulders of the hub portion, thereby providing a space therebetween.

9. In a rotary actuator, apparatus according to claim 8, and means providing communication between the exterior of said housing and said space.

10. In a rotary actuator having a hollow housing for containing therein an actuator vane, and fluid under pressure, said housing being closed at the ends by inner end walls having inwardly confronting end wall surfaces, the combination comprising:
  coaxially aligned shaft bores extending into said housing through said end walls;
  a cylindrical shaft means extending through said bores;
  a coaxial, substantially cylindrical hub on said shaft means in said housing intermediate said end wall surfaces, said hub having a greater diameter than said shaft means and thereby forming axially oppositely facing annular shoulders at opposite ends of said hub;
  a pair of sealing ring means coaxially surrounding said shaft means, said sealing ring means each having an axially, outwardly facing, laterally extending annular surface, an axially, inwardly facing, laterally extending annular surface, a laterally outwardly facing, axially extending cylindrical surface, and a laterally inwardly facing, axially extending cylindrical surface, one each of said sealing ring means being positioned with its said axially outwardly, laterally extending annular surface in abutment with one each of said end wall surfaces and with its said laterally, inwardly facing, cylindrical surface in axially movable, encircling engagement with one end of the end portions of said hub surrounding an adjacent annular shoulder;
  a vane member fixed to said hub portion, said vane member extending laterally from and longitudinally of said hub portion with laterally extending, axially facing opposite end surfaces thereof in close juxtaposition with said confronting inner end wall surfaces;
  a rectangular sectioned, axially facing, laterally extending groove formed in each of said laterally extending opposite end surfaces;
  a pair of axially outer, elongated, rectangular sectioned sealing elements positioned slidably side by side in each of said grooves, with the laterally inwardly facing ends of each such pair positioned in engagement with the said laterally outwardly facing cylindrical surface of one each of said pair of sealing ring means, and with the axially outwardly facing, laterally extending sides thereof in sliding abutment with one each of said end wall surfaces;
  an axially inner, elongated, rectangular sectioned sealing element positioned slidably in each of said grooves, in covering abutment with the length and width of the axially inwardly facing surfaces of said pair of axially outer sealing elements, the laterally inner end portions of said axially inner sealing elements being positioned in contact on one side thereof with the said axially inwardly facing, annular surface of one each of said sealing ring means;
  and resilient means urging said last mentioned sealing elements axially against said sealing means and in turn urging said sealing ring means against the aforesaid confronting end wall surfaces.

11. In a rotary actuator having a hollow housing formed with an axially extending, semi-cylindrical, inner side wall surface, opposite, axially spaced apart, inner end wall surfaces, and an inner, axially extending transverse wall surface opposite said semi-cylindrical side wall surface, the combination comprising:
  a shaft member rotatably supported by said housing and extending coaxially of said inner side wall surface from end wall to end wall of said housing;
  a coaxial, substantially cylindrical hub portion on said shaft in said housing, intermediate said end wall surfaces, said hub portion having a greater diameter than said shaft and thereby forming axially, oppositely facing, annular shoulders at the opposite ends of said hub portion, the outer cylindrical surface of said hub portion being positioned in close juxtaposition with an intermediate portion of said transverse wall surface, said wall surfaces and the exterior surface of said hub portion joining each other to form a closed chamber within said housing having the form substantially of a sector of a hollow cylinder;
  a vane member fixed to said hub portion, said vane member extending laterally from and longitudinally of said hub portion with the outer edge and opposite end surfaces thereof in close juxtaposition with said semi-cylindrical inner wall surface and said opposite inner end wall surfaces, respectively, thereby dividing said chamber into two arcuate chambers of variable volume on opposite sides of said vane member;
  an axially facing, coaxial, annular groove formed in each of said annular shoulders;
  a pair of axially, oppositely facing bushing rings coaxially surrounding said shaft, each of said bushing rings being L-shaped in radial section and thereby each having an inner, axially extending, annular cylindrical leg portion and an integral, radially outwardly extending, annular flange leg portion, each of said bushing rings being positioned with its said cylindrical leg portion contained within its respective one of said annular grooves and with the adjacent, radially extending face of its flange leg portion in sealing abutment with its respective one of said annular shoulders;
  a pair of axially, oppositely facing sealing rings coaxially surrounding said shaft, each positioned axially outwardly adjacent one of said bushing rings, each of said sealing rings being substantially L-shaped in radial section and thereby each having an outer, axially extending, annular cylindrical leg portion and an integral, radially inwardly extending, annular flange leg portion, one of each of said sealing rings being positioned with the inner cylindrical surface of its said cylindrical leg portion in coaxial, telescopic engagement over the outer edge of said flange leg portion of each of said bushing rings, with the adjacent, radially extending surface of its said flange leg portion substantially coextensively adjacent the other radially extending, annular flange of the flange leg portion of each of said bushing rings, and with the opposite outer, radially extending surface of said flange leg portion in abutment with each of said end wall surfaces;
  and a pair of ducts extending from the exterior of said housing and into said closed chamber at spaced apart locations therein on opposite sides of said vane member.

12. In a rotary actuator having a housing formed with an axially extending, semi-cylindrical, inner side wall surface, opposite, axially spaced apart, inner end wall surfaces, and an inner, axially extending, transverse wall surface, the combination comprisnig:
  a shaft member rotatably supported by said housing and extending coaxially of said inner side wall surface from end wall to end wall of said chamber;

a coaxial, substantially cylindrical hub portion on said shaft in said housing, intermediate said end wall surfaces, said hub portion having a greater diameter than said shaft and thereby forming axially, oppositely facing, annular shoulders at the opposite ends of said hub portion, the outer cylindrical surface of said hub portion being positioned in close juxtaposition with an intermediate portion of said transverse wall surface;

a pair of ring means encircling said shaft, each being positioned in axial abutment with its respective one of said shoulders and adjacent end wall surface;

a vane member fixed to said hub portion, said vane member extending laterally from and longitudinally of said hub portion with the longitudinally extending outer edge thereof, and the radially extending portion of the end surfaces thereof which extend outwardly of the outer surface of said ring means, in close juxaposition with said semi-cylindrical inner wall surface and said inner end wall surfaces, respectively, thereby dividing said chamber into two arcuate working chambers of variable volume on opposite sides of said vane member;

a rectangular sectioned, axially facing, radically extending groove formed in each of said radially extending portions of said end surfaces of said vane member;

a rectangular sectioned, radially facing, longitudinally extending groove formed in said outer edge of said vane member, said radially extending and longitudinally extending grooves joining to form a continuous, substantially U-shaped, rectangular sectioned groove;

sealing assemblies slidably contained in each said radially extending groove, each such assembly comprising;

an axially outer pair of sealing means each including a pair of elongated, rectangular sectioned sealing elements positioned in lengthwise alignment with respect to one another and separated endwise by an intermediate gap containing a resilient biasing means urging said elements apart lengthwise, said outer pairs of sealing means being positioned in side by side substantially coextensive abutment with one another within the width of said radial groove, with the gaps thereof staggered lengthwise with respect to one another and with the inner ends thereof riding on the outer cylindrical, peripheral surface of one of said ring means, and an axially inner sealing means including an elongated rectangular sectioned sealing element positioned in lengthwise covering abutment with the width of the axially inwardly facing surfaces of said outer pairs of sealing means, there being resilient biasing means at the inner ends of said inner sealing means urging said inner sealing means radially outward; a sealing assembly slidably contained in said longitudinally extending groove, such assembly comprising;

a radially outer pair of sealing means, each including a pair of elongated, rectangular sectioned sealing elements positioned in lengthwise alignment with respect to one another and separated endwise by an intermediate gap containing resilient biasing means urging said element apart lengthwise, said pairs of sealing means being positioned in side by side, substantially coextensive abutment with one another within the width of said longitudinally extending groove, with the gaps thereof staggered lengthwise with respect to one another and each with one end of one of the sealing elements thereof in abutment with the inner side of the outer end portion of one of the sealing elements of the outer pair of sealing means contained in one of said radially extending grooves and with the other end portion of the other one of the sealing elements thereof extending abuttingly over the outer end of the other one of the sealing elements of the outer pair of seating means contained in one of said radially extending grooves, and with the outer end thereof in abutment with one of said end wall surfaces, and a radially inner sealing means including a pair of elongated, rectangular sectioned sealing elements positioned in lengthwise alignment with respect to one another and separated by an intermediate gap containing a resilient biasing means urging said elements apart lengthwise, said radially inner sealing means being positioned in lengthwise covering abutment with the width of the radially inwardly facing surfaces of said radially outer pair of sealing means, and with the axially opposite outer ends of said radially inner sealing means in abutment with the axially inwardly facing surfaces of the end portions of the axially inner sealing means in said radial grooves.

13. In a rotary actuator, apparatus according to claim 12 and resilient means between said radially inner sealing means and said vane urging said inner sealing means radially outwardly of said vane in said longitudinally extending groove, thereby urging the radially outer surfaces of said radially outer pair of sealing means into engagement with the said semi-cylindrical, inner side wall surface.

14. In a rotary actuator having a housing formed with an axially extending, semi-cylindrical, inner side wall surface, opposite, axially spaced apart, laterally extending inner end wall surfaces, and an inner, axially extending, transverse wall surface, the combination comprising:

a shaft bore extending into said housing through at least one of said end walls;

a cylindrical shaft extending through said bore and into said housing;

a coaxial, substantially cylindrical hub portion on said shaft in said housing intermediate said end wall surfaces, said hub portion having a greater diameter than said shaft and thereby forming axially, oppositely facing, annular shoulders at the opposite ends thereof, and the outer cylindrical surface of said hub portion being positioned in close juxtaposition with an intermediate, axially extending portion of said transverse wall surface, said wall surfaces and the exterior surface of said hub portion thereby substantially joining each other to form a chamber within said housing having the form substantially of a sector of a hollow cylinder;

an axially facing, coaxial, annular groove formed in each of said annular shoulders, the diameter of the inner, minimum-diameter side of such grooves being equal to the diameter of the surface of the adjacent portions of said shaft;

a pair of axially, oppositely facing bushing rings coaxially surrounding said shaft, each immediately adjacent one of said shoulders, each of said bushing rings being L-shaped in radial section and thereby each having an inner, axially extending, annular cylindrical leg portion and an integral, radially outwardly extending, annular flange leg portion, each of said bushing rings being positioned with its said cylindrical leg portion contained within its respective one of said annular grooves and with the adjacent, radially extending face of its said flange leg portion in sealing abutment with the surface of its respective one of said annular shoulders;

a pair of axially, oppositely facing, sealing rings coaxially surrounding said shaft, each positioned axially outwardly adjacent one of said bushing rings, each of said sealing rings being substantially L-shaped in radial section and thereby each having a radially outer, axially extending, annular cylindrical leg portion and an integral, radially inwardly extending, annular flange leg portion, each of said sealing rings being positioned with the radially inner cylindrical surface of its said cylindrical leg portion in coaxial encirclement of the outer edge of the flange leg portion of its respective one of said bushing rings and with the adjacent, radially extending surface of its said flange leg portion substantially coextensively adjacent the axially outer, radially extending, annular face of the flange leg portion of its respective one of said bushing rings, and with the opposite axially outer, radially extending surface of said flange leg portion in abutment with one of said end wall surfaces;

a pair of arcuate grooves in said housing coaxial with said shaft and extending through the said housing in the portion thereof opposite said end wall surfaces to accommodate said cylindrical leg portion of each of said sealing rings therein;

a rectangular sectioned, radially inwardly facing, longitudinally extending groove formed in said intermediate portion of said transverse wall surface, said groove terminating at axially opposite ends adjacent said inner end wall surfaces and in said arcuate grooves;

a sealing assembly slidably contained in said longitudinally extending groove comprising;

a radially outer pair of sealing means, each including a pair of elongated, rectangular sectioned, sealing elements positioned in lengthwise alignment with respect to one another and separated endwise by an intermediate gap containing resilient biasing means urging said elements apart lengthwise, said pairs of sealing elements being positioned in side by side, substantially coextensive abutment with one another within the width of said longitudinally extending groove, with the gaps thereof staggered lengthwise with respect to one another and each with one of the longitudinally outer opposite ends of the sealing elements thereof in abutment with the axially confronting radially extending annular surfaces of the cylindrical leg portions of said sealing rings;

and a radially outer sealing means including an outer pair of elongated, rectangular sectioned sealing elements positioned in lengthwise alignment with respect to one another and separated by an intermediate gap, staggered with respect to the aforesaid gaps, containing resilient biasing means urging said elements apart, lengthwise, said radially outer sealing means being positioned in lengthwise covering abutment with the full length and width of the radially outwardly facing surfaces of said radially inner pair of sealing means;

and resilient means urging said radially outer sealing means into said position of abutment with said inner pair of sealing means, thereby also urging said inner pair of sealing means elements radially inwardly into abutment with the cylindrical surface of said hub portion.

15. In a rotary actuator, apparatus according to claim 14 and a pair of relatively short rectangular sectioned sealing elements one each of which is positioned intermediate the longitudinally outer opposite ends of the said sealing elements of said radially outer sealing means and the adjacent portion of said inner side wall surface.

16. In a rotary actuator, apparatus according to claim 15 and resilient means urging said relatively short sealing elements radially inwardly against the radially outer cylindrical surfaces of said outer, axially extending, annular cylindrical leg portions of said sealing rings.

References Cited by the Examiner
UNITED STATES PATENTS

| | | | |
|---|---|---|---|
| 103,212 | 5/70 | Long. | |
| 397,919 | 2/89 | Hornig. | |
| 2,455,628 | 12/48 | Ulrich. | |
| 2,487,449 | 11/49 | Knudson | 230—207 |
| 2,540,903 | 2/51 | Moushey et al. | |
| 2,636,667 | 4/53 | Frei | 230—207 |
| 2,798,462 | 7/57 | Ludwig et al. | |
| 2,902,009 | 9/59 | Ludwig et al. | |
| 3,033,180 | 5/62 | Bentele | 123—8 |
| 3,070,959 | 1/63 | Giampapa. | |

FOREIGN PATENTS 70,322  11/15  Switzerland.

KARL J. ALBRECHT, *Primary Examiner.*

JOSEPH H. BRANSON, JR., *Examiner.*